Jan. 12, 1932.  J. R. MARTIN  1,840,967

HIGH PRESSURE SAFETY VALVE MECHANISM

Original Filed May 5, 1928    3 Sheets-Sheet 2

Inventor
John R. Martin
By Hardway Tathey
Attorneys

Jan. 12, 1932.  J. R. MARTIN  1,840,967
HIGH PRESSURE SAFETY VALVE MECHANISM
Original Filed May 5, 1928  3 Sheets-Sheet 3

Inventor
John R. Martin
By
Hardway & Cathey
Attorneys

Patented Jan. 12, 1932

1,840,967

UNITED STATES PATENT OFFICE

JOHN R. MARTIN, OF HOUSTON, TEXAS, ASSIGNOR OF ONE-THIRD TO R. L. WAXLER, OF HARRIS COUNTY, TEXAS

HIGH PRESSURE SAFETY VALVE MECHANISM

Application filed May 5, 1928, Serial No. 275,272. Renewed February 6, 1931.

This invention relates to new and useful improvements in a high pressure safety valve mechanism.

One object of the invention is to provide a device of the character described specially designed for the purpose of completely and quickly closing the upper end of a well casing, particularly in cases when the well has been drilled into an oil or gas stratum and the fluid is forced under high pressure up through said casing, around the inner pipe or drill stem.

Another object of the invention is to provide a device of the character described for controlling fluid, under pressure, in a well, and which may be operated either manually or automatically, to effect the closing of the upper end of the well casing.

A still further feature of the invention is to provide a device of the character described which is effective, when operated into closed position, not only to effectively and completely close the upper end of the outer casing, around the inner casing or drill pipe, but also to securely close the joints between the co-acting parts of the device itself, to prevent the escape of the fluid up between the inner casing and the device as well as through the joints of the device.

With the above and other objects in view this invention has particular relation to certain novel features of construction, operation and arrangement of parts an example of which is given in this specification and illustrated in the accompanying drawings, wherein:—

Figure 1:
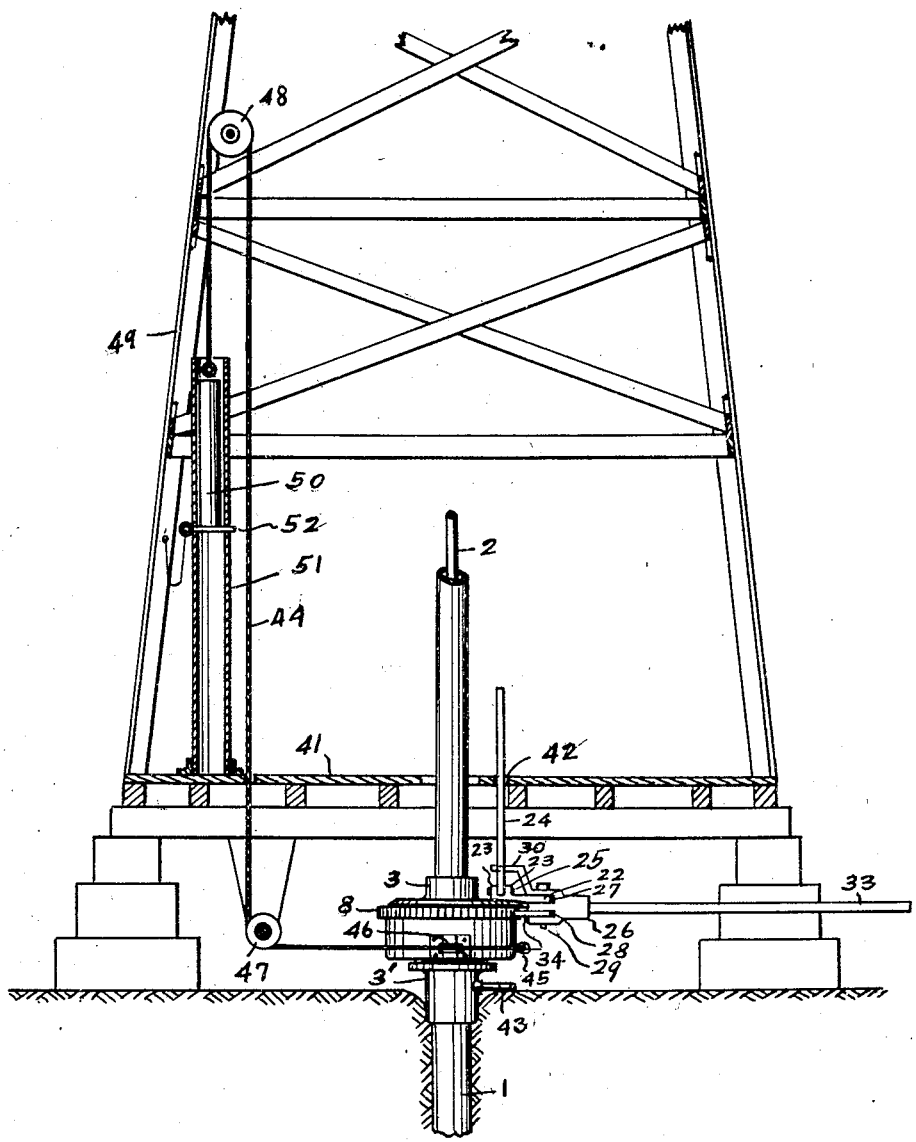
Figures 2, 3:
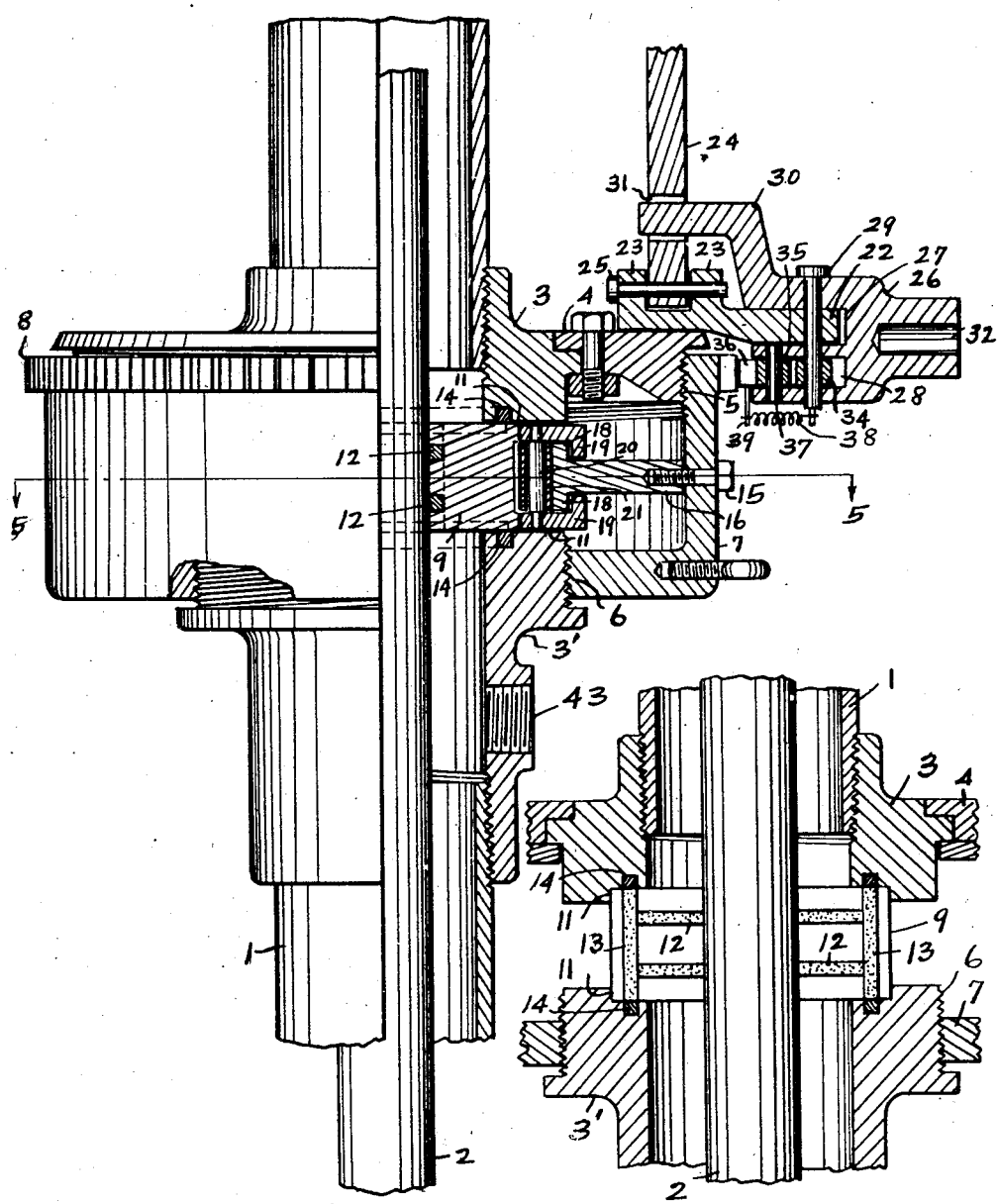
Figure 4:
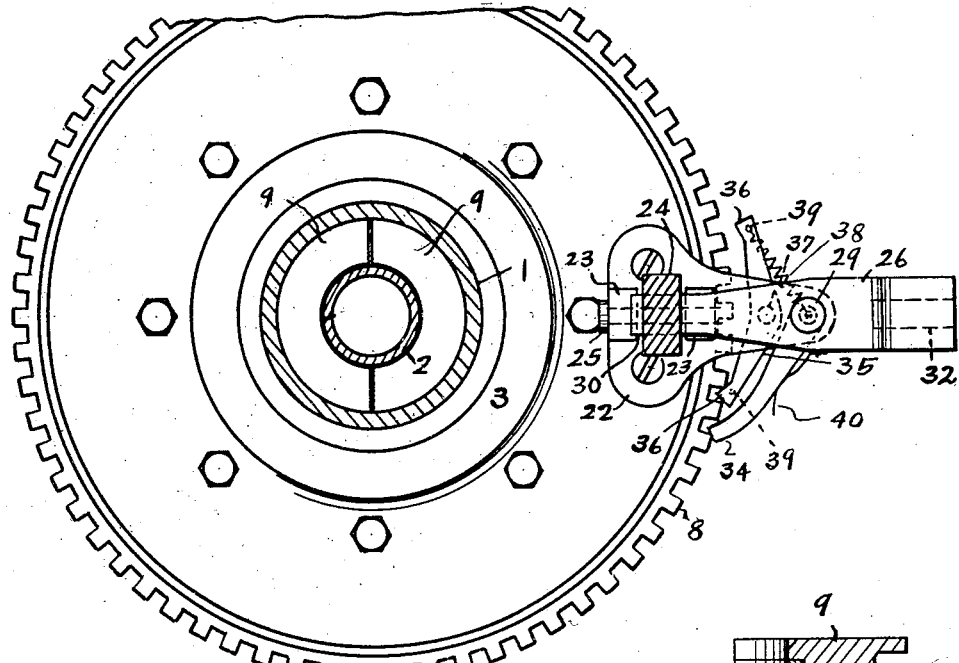
Figure 6:
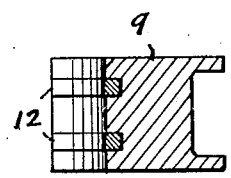
Figure 5:
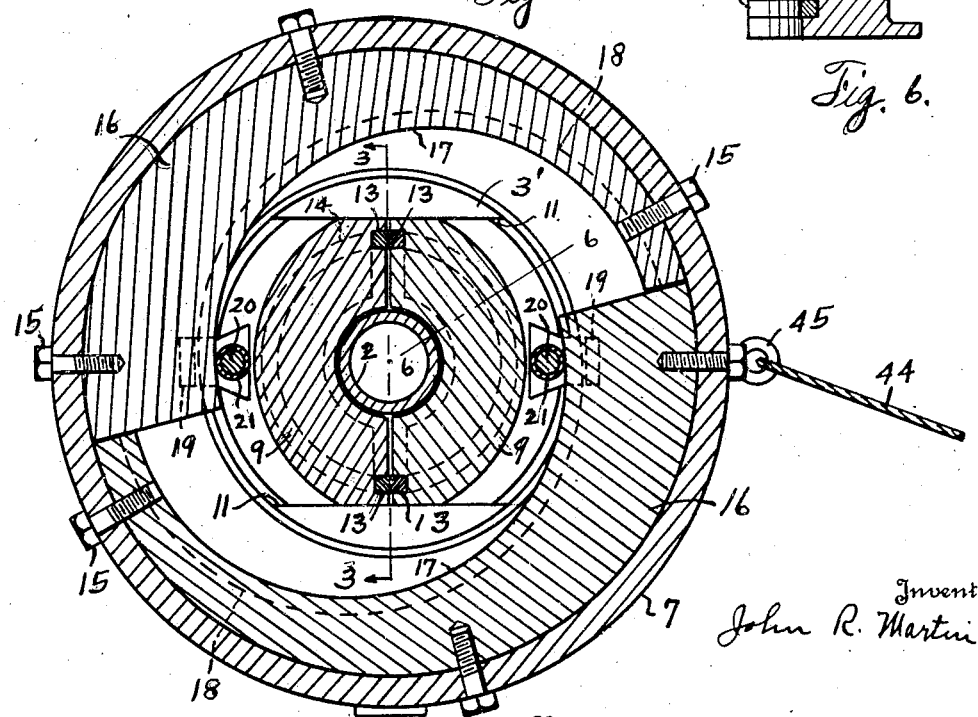

Figure 1 shows a side view of the device, as applied to a well casing, and shown partly in section, Figure 2 shows a side view thereof partly in section, Figure 3 shows a fragmentary vertical sectional view, taken on the line 3—3 of Figure 5, Figure 4 shows a plan view of the device, Figure 5 shows a horizontal sectional view taken on the line 5—5 of Figure 2, and Figure 6 shows a vertical cross sectional view of one of the valves, taken on the line 6—6 of Figure 5.

Referring now more particularly to the drawings, wherein like numerals of reference designate similar parts in each of the figures, the numeral 1 designates the well casing into which the valve mechanism is incorporated, and the numeral 2 designates the inner pipe, or drill stem.

Attached to the adjacent upper and lower sections, of the outer casing 1 are the upper and lower annular, flanged connections 3 and 3', forming the upper and lower ends, respectively, of the casing of the valve mechanism. There is an annular flange 4 bolted to and surrounding the upper connection 3 and said flange 4 and the connection 3' have the external right and left hand threads 5 and 6, respectively, onto which the corresponding upper and lower ends of the enclosing housing 7 are threaded, said housing forming the enclosing side walls of said casing. This housing is formed with an external, annular gear 8.

In the casing are the oppositely disposed valves 9, 9, whose facing sides have arcuate notches, or seats, to receive the inner pipe 2 and to fit closely therearound when the valves are actuated into active, or closed, position. The valves slide toward and from each other in the oppositely disposed counter sunk tracks 11, 11 in the facing sides of the upper and lower connections 3, 3'. Counter sunk into the arcuate faces, or seats, of the valves, are the packing 12, 12 and counter sunk into the abutting ends of the valves are the packing 13, 13. The packing 12, 13 of one valve aligning with the corresponding packing, of the other valve, and counter sunk in the facing ends of the upper and lower connections 3 and 3' are the packing rings 14 which align with the end packing 13, of the valves, when the valves are in active, or closed, position.

Anchored in the housing 7, preferably by stud bolts, as 15, are the oppositely disposed actuating members 16, 16, whose inner faces have the correspondingly inclined cam faces 17, 17, which are widened forming the upper and lower retaining flanges 18, 18. Upper and lower dogs 19, 19 have their inner ends dovetailed into the outer edges of the valves and their outer ends engaged over the corresponding retaining flanges 18. Bearing pins, as 20, 20, have their ends journaled into the dovetailed ends of the respective dogs 19, of each valve 9 and antifriction roller bearings 21, 21 are mounted on said pins, and work against the corresponding cam faces 17.

Anchored to the flange 4, and extending outwardly therefrom, there is a bracket 22, having the spaced upstanding lugs 23, 23 between which the lower end of the operating handle 24 is pivoted. A pin 25 extends through said lugs and through the lower end of said handle and forms said pivotal connection. A head 26 is provided whose inner end has the upper and lower deep slots 27, 28. The outer end of the bracket 22 projects into the slot 27 and a pin 29 is fitted through said head and through a bearing in the outer end of the bracket 22. The head 26 has an inwardly extending arm 30 which works through a bearing 31 in the handle 24. The outer end of the head has a deep socket 32 to receive the inner end of another operating handle 33.

There is a holding dog 34, one end of which is pivoted on the pin 29 in the outer end of the slot 28 and the free end of this dog engages one of the gear teeth 8 to prevent any backward rotation of the housing 7 in closing the valves. There is a yoke 35, pivotally mounted in the slot 28 which extends each way beyond the head 26 and whose ends are formed into oppositely working dogs 36, 36. This yoke pivots on the pin 37 whose ends are journaled in the head 26. There is a pull spring 38, one end of which is permanently attached to the lower end of the pin 29 and whose other end may be attached to either of the pins 39, 39 depending from the dogs 36, 36. When the spring 38 is attached to one of the pins 39 the opposite dog 36 will be held in engagement with the gear teeth 8, as shown in Figure 4. Assuming that the valves 9 are in open position, the handle 24, or the handle 33, may now be manipulated back and forth and when moved in a clockwise direction the housing 7 will be correspondingly turned, but when manipulated in the other direction, the engaging dog 36 will operate idly and the dog 34, under the influence of the spring 40, will meanwhile hold the housing 7 against any backward rotation that might be caused by the strong fluid pressure within the casing. As the handle is thus manipulated back and forth the housing 7 will gradually be turned, in a clockwise direction, and the cam faces, 17, operating against the outer sides of the valves 9 will force the valves inwardly close around the inner pipe 2, and the space between said outer casing and inner pipe will be completely closed. The threads 5 and 6 are so oppositely pitched that as the valves 9 are forced inwardly the ends 3 and 3', of the casing will be drawn together so as to clamp tightly against opposite sides of the valves to form fluid tight joints therewith.

In order to open the valves the spring 38 may be detached from the pin 39, to which it is attached, and attached to the other pin 39 to hold the other dog 36 in operative engagement with the teeth 8, and the dog 34 manually held disengaged from the rack teeth 8 and one of the handles 24, or 33, manipulated, as before, so as to turn the housing 7 in the opposite direction, and this will operate, through the mechanism, described, to open the valves and to release the casing ends 3 and 3' from clamping relation with said valves.

The valve mechanism may be located beneath the derrick floor 41, as shown, in which case the handle 24, if used, will work through the slot 42 in said floor. Ordinarily, however, when the valve mechanism is located beneath the floor the handle 24 will be detached and the handle 33, only, used. The mechanism may be located above the derrick floor, if desired, in which case the handle 24 will ordinarily be used and the handle 33 detached.

When the valves 9 are closed around the inside pipe 2 the fluid seeking to escape from the well may be relieved through the outlet line 43 which is connected into the valve casing beneath the valves.

Provision is made for closing the valves automatically. This is necessary in cases where the pressure is so strong that the mechanism cannot be safely operated by hand. For the mechanical operation of the valves a cable 44 has one end attached to an eye bolt 45, attached to one side of the housing. This cable passes around a pulley 46, carried by one side of the housing, and operates over another pulley 47, depending from the derrick floor and passes up through said floor and works over a third pulley 48 in the derrick 49, and its other end carries a weight 50 which works in a vertical tubular guide 51, on the floor 41, and normally is sustained on a removable cross pin 52 in said guide.

When it is desired to close the valve 9 around the pipe 2 the pin 52 may be removed and the weight 50 will suddenly drop exerting a pull, through the cable 44, on the housing 7, in a clockwise direction, and thus closing said valves as above stated.

It is of course obvious that the threads 5 and 6 may be pitched in either direction, so that the housing 7 may be turned either way to open said valves and in the opposite way to close them, but said threads 5 and 6 must be pitched in opposite directions.

It is obvious that mechanical changes may be made and equivalents substituted for the parts shown and I reserve the right to make such changes and substitutions as may be comprehended within the scope of the appended claims.

What I claim is:—

1. A valve mechanism including a casing having upper and lower ends and a housing connected to said ends by right and left hand threads, respectively, oppositely disposed valves therein, means connecting the housing and valves through which the rotation of the housing is effective to actuate the valves.

2. A valve mechanism including a casing having upper and lower ends and a housing, operative connections between the housing and the casing ends through which the said ends are relatively moved, toward or from each other, as the housing is rotated relative to the ends, confronting valves in the casing operatably connected with the housing and operatable thereby as the housing is rotated.

3. A valve mechanism including a casing having upper and lower ends and a housing connected to said ends by right and left hand threads, respectively, said housing being rotatable relative to said ends and being effective to move the ends toward and from each other, as the housing is rotated relative to said ends, confronting radially movable valves in the casing and means connecting said housing and valves and effective to move the valves radially as the housing is rotated.

4. A valve mechanism including a casing, confronting radially movable valves therein, said casing comprising end members between which the valves are located, and a housing rotatable relative to said end members, operative connections between the housing and end members and other operative connections between the housing and valves, said connections being effective to move said valves and end members inwardly when the housing is rotated in the one direction, and to move said valves and end members outwardly when the housing is rotated in the other direction.

5. A valve mechanism including a casing, confronting radially movable valves therein, said casing comprising end members between which the valves are located, and a housing rotatable relative to said end members, operative connections between the housing and end members and other operative connections between the housing and valves, said connections being effective to move said valves and end members inwardly when the housing is rotated in one direction and to move said valves and end members outwardly when the housing is rotated in the other direction and means for rotating the housing relative to said end members and valves.

6. A valve mechanism including a casing, confronting valves therein, means for moving the valves radially, said means being effective to contract the casing against the valves, when the valves are moved in one direction and to expand the casing from the valves when the valves are moved in the other direction.

7. A valve mechanism including a casing, confronting valves therein, means for moving the valves into and out of cooperating relation, said means being effective to move the adjacent parts of the casing toward and from said valves as the valves are moved into and out of said cooperating relation, respectively.

8. A valve mechanism including a casing composed of end members and an enclosing housing, independently rotatable relative to said members and operatively connected with said members and effective to move them toward or from each other as the housing is so rotated, confronting valves between said end members movable toward and from each other, operative connections between the housing and valves effective to operate the valves when the housing is rotated.

9. A valve mechanism including a casing adapted to be secured to an outer pipe and comprising end members relatively movable toward and from each other, confronting valves between said ends having complemental notches, adapted to receive an inner pipe, said valves being movable toward and from each other, a housing operatively connected with said end members and with said valves, said housing being effective, through said connections, to actuate said valves inwardly around the inner pipe and simultaneously to move said end members against said valves, when rotated in one direction and to actuate the valves outwardly and simultaneously to move the end members away from said valves, when rotated in the other direction.

10. A valve mechanism including a casing adapted to be secured to an outer pipe and comprising end members relatively movable toward and from each other, confronting valves between said ends having complemental notches, adapted to receive an inner pipe, said valves being movable toward and from each other, a housing operatively connected with said end members and with said valves, said housing being effective, through said connections, to actuate said valves inwardly around the inner pipe and simultaneously to move said end members against said valves, when rotated in one direction and to actuate the valves outwardly and simultaneously to move the end members away from said valves, when rotated in the other direction and means for rotating said housing.

11. A valve mechanism including a casing composed of end members and an enclosing housing independently rotatable relative to said members and operatively connected with said members and effective to move them toward or from each other as the housing is so rotated, confronting valves between said end members movable toward and from each other, operative connections between the housing and valves effective to operate the valves, when the housing is rotated, a flexible member attached to the housing, and releasable means attached to said flexible member and adapted to exert a pull therethrough, when released, to rotate the housing.

12. A valve mechanism including a casing having spaced ends, oppositely disposed valves between said ends movable toward and from each other, a housing rotatable independently of the ends and connected to said ends, inside cam faces carried by the housing and operatable against the corresponding valves, and other operative connections between the housing and valves.

13. A valve mechanism including a casing having spaced ends, oppositely disposed valves between said ends movable toward and from each other, a housing rotatable independently of the ends and connected to said ends by oppositely pitched threads, inside cam faces carried by the housing and operatable against the corresponding valves, and other operative connections between the housing and valves and means for rotating the housing.

14. A valve mechanism including a casing, oppositely disposed confronting valves therein, said casing comprising ends, and a housing connected to and independently rotatable relative to said ends, means connecting the valves to the housing through which the valves are moved as the housing is rotated, a flexible member attached to the housing, means attached to the flexible member and adapted to exert a pull therethrough to rotate said housing, means normally holding said pulling means in inactive position, said holding means being releasable to permit the operation of said pulling means.

15. A valve mechanism including a casing adapted to be connected to an outer pipe, oppositely disposed valves in the casing shaped to surround an inner pipe and movable in the casing toward or from said inner pipe, operative connections effective to actuate the valves upon the relative rotation of said casing and valves.

16. A valve mechanism including a casing, radially movable valves therein shaped to surround an inner pipe in the casing, operative connections between the casing and valves whereby said valves may be moved radially in either direction by an appropriate relative rotation of the casing with respect to the valves.

17. A blow out preventer for closing the space between an outer pipe and an inner pipe and including a casing rotatable about the outer pipe, radially movable valves having seats shaped to fit closely about said respective pipes, cams carried by the casing and operatively connected with said valves and effective to actuate said valves.

18. A blow out preventer for closing the space between an outer pipe and an inner pipe and including a casing rotatable about said outer pipe, valves in the casing movable radially into active and inactive positions, said valves being shaped to fit closely about said pipes, when in said active position, cams in the casing in operative connection with the valves, means for rotating the casing to effect the movement of said valves into either of said positions.

19. A blow out preventer for closing the space between an outer and an inner pipe and including a casing rotatable about said outer pipe, valves in the casing movable radially into active and inactive positions, said valves being shaped to fit closely about said pipes, when in said active position, cams in the casing in operative connection with the valves, means for rotating the casing to effect the movement of said valves into either of said positions, and tracks for guiding the movements of the valves.

20. A blow out preventer for closing the space between an inner and an outer pipe, and including a valve casing rotatable about the outer pipe, valves in and operatively connected with the casing and arranged to be moved radially by the rotation of the casing into active position to close said space and into inactive position to open said space.

21. A blow out preventer for closing the space between an inner and an outer pipe, and including a valve casing rotatable about the outer pipe, valves within, and operatively connected with, the casing, and movable into active or inactive position through the rotation of said casing, said outer pipe having an opening through which the valves may be moved into active position to close said space and into inactive position to open said space.

22. A blow out preventer for closing the space between an outer pipe and an inner pipe and including a casing mounted, on and rotatable about, said outer pipe, valves within said casing movable into active position to surround and form fluid tight joints with said inner and outer pipes and to close the space between said pipes, said valves being also movable into inactive position to open said space, operative connections between said valves and casing whereby said valves may be actuated into either of said positions by an appropriate movement of such casing.

23. The combination with an inner pipe and an outer pipe, said outer pipe having an opening, valves movable into active position through said opening and around the inner pipe to close the space between said pipes, and movable also into inactive position, to open the space between said pipes, a casing rotatable around said outer pipe and operatively connected with said valves and effective to actuate the valves into active or inactive positions.

24. In a blow out preventer a rotatable casing, confronting valves therein and means through which the valves are moved in radial direction only, through the rotative movement of the casing.

25. In a blow out preventer for closing the space between an outer and inner pipe, a rotatably mounted casing, opposing valves therein, operative connections through which the valves may be moved into active position to close said space or into inactive position to open said space by the rotative movement of the casing.

In testimony whereof I have signed my name to this specification.

JOHN R. MARTIN.